United States Patent Office 2,719,425
Patented Oct. 4, 1955

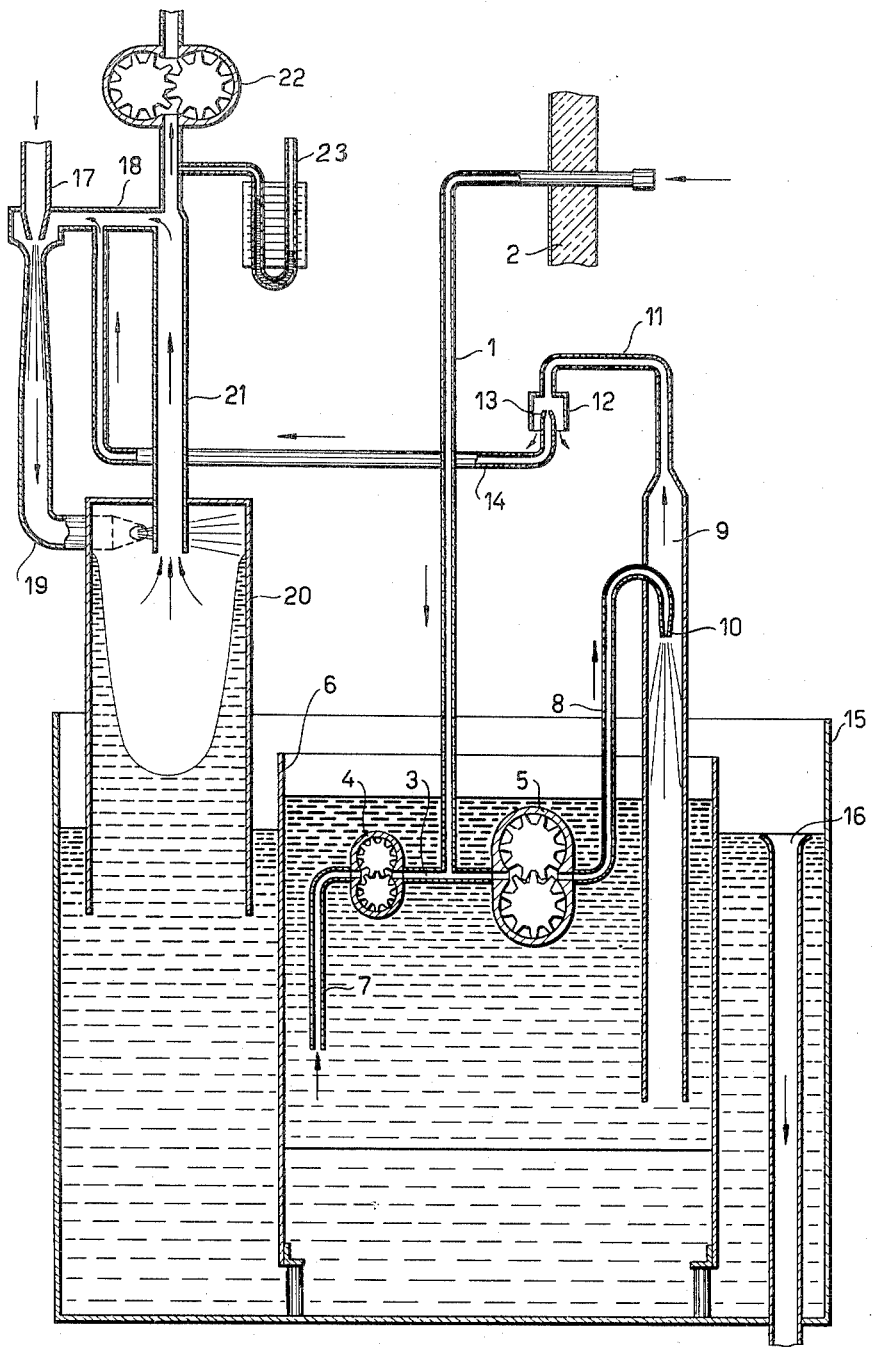

2,719,425

GAS ANALYSIS APPARATUS

Karl Torsten Källe, Säffle, Sweden

Application September 23, 1952, Serial No. 311,011

Claims priority, application Sweden February 29, 1952

1 Claim. (Cl. 73—23)

The present invention relates to a gas analysis apparatus for continuous control of the amount of certain gas constituents in a gas mixture, for instance the percentage of carbon dioxide in combustion gases. The apparatus is especially constructed for the purpose of obtaining a highly rapid indication of the composition of the gas mixture in order to provide suitable conditions for an automatic regulation and is characterised in that it comprises in combination a gas purifier connected to the source of the gas to be analysed, a gas absorber connected to the purifier by a conduit having a restricted passage, a rotary pump, preferably a gear pump, operating with a constant amount of gas per unit of time and having its suction side connected to the absorber, and a manometer connected to the suction conduit of the pump to indicate variations in pressure occurring in the system after the restricted passage as a result of the removal of certain gas constituents in the absorber. Since the rotary pump works with a constant speed and consequently sucks a constant amount of gas per unit of time, the restricted passage in the conduit before the absorber will, at the absorption of certain gas constituents, cause a negative pressure at the suction side of the pump, and this negative pressure, indicated by the manometer, constitutes a direct measure of the percentage of gas absorbed. The variations in negative pressure can also be used for supplying impulses to a suitable regulator working to restore the desired gas composition. For instance, when controlling the percentage of $CO_2$ in combustion gases, this regulation can be made in such a way that a regulator is caused to more or less open or restrict the supply of air to the furnace.

The purifier and the absorber may be of types previously known per se, but the invention also here comprises new constructions which further improve the effect of the gas analysis apparatus described above.

When samples of gas are continuously withdrawn from fire places, soda furnaces, etc. for analysis, there arises a problem how to effectively purify the gases from dispersed solid particles, before introducing them into the gas analysis apparatus. As these solid particles are generally very fine, it has been necessary to suck the gases from the furnace through ceramic filters of very fine porosity. As a consequence, however, the speed of the gas through the filter becomes slow, and to compensate this the filters must be given a relatively large volume. This, again, has the drawback that the quantity of gas withdrawn is renewed only slowly and that a relatively long time passes until a change in the composition of the gas is indicated by the gas analysis apparatus. A required regulation in order to restore the initial condition is thus delayed, which may cause difficulties or drawbacks of varying kinds. In a preferred embodiment of the apparatus according to the invention, the purifier comprises a gear pump having its suction side connected to the source of gas and besides being arranged simultaneously to suck oil. In this gear pump gas and oil are thoroughly mixed to a fine emulsion and the solid particles are thereby transmitted from the gas to the oil. A conduit from the pressure side of the pump ends into a chamber in which the purified gas is separated from the oil which latter retains the solid impurities. The upper part of said chamber has a discharge conduit by which the gas is led to the absorber through the restricted passage previously mentioned.

For the absorption of gases it has hitherto been common to use absorption towers, in which a supplied gas or mixture of gases is subjected to a spray of liquid. Such a device may, of course, also be used in the gas analysis apparatus according to the invention, but it has proved that it is rather difficult in this way to obtain such a rapid absorption as is necessary for continuous control of the composition of a gas mixture flowing through, especially in such cases, where it is required, guided by the indicated value, quickly to regulate undesirable changes in the composition. Owing to the relatively slow absorption in the tower, the gas mixture must remain in it for some time. Thus, a comparatively large quantity of gas is assembled in the tower, and consequently a change in the composition of the entering gas will only by and by affect the indicated value. The improved gas absorber included as a part of the preferred embodiment of the apparatus according to the invention eliminates this drawback entirely. The gas coming from the purifier through the restricted passage is led to the suction conduit of a fluid jet pump driven by a source of liquid. The discharge of this pump opens tangentially into the upper part of a substantially vertical cylinder, the bottom end of which is closed by means of a liquid trap. In the fluid jet pump the gas is quickly and effectively dispersed in the liquid, and the speed of absorption is favoured by the possibility of bringing large quantities of liquid into contact with rather small amounts of gas. Besides, a certain overpressure arises at the outlet from the jet pump, whereby the absorption is further facilitated. At the inside of the vertical cylinder the mixture of gas and fluid will come into rapid rotation along a falling helical line, owing to the tangential direction of the jet, so that a continuous ring of fluid is formed. By this centrifugation the undissolved gas constituents are quickly separated from the liquid. The top of the cylinder is by a conduit connected to the suction side of the rotary pump and, as previously mentioned, the negative pressure caused by the gas absorption will be dependent on the percentage of gas absorbed.

The gas analysis apparatus according to the invention will be more closely described below with reference to the accompanying drawing which shows a preferred embodiment also including the purifier and absorber mentioned above.

In the drawing, 1 indicates a conduit, the inlet of which projects through the wall 2 of a furnace. A wire netting surrounds the inlet to prevent introducing of coarse impurities. The conduit 1 ends in a pipe 3 connecting the pressure side of a smaller gear pump 4 to the suction side of a larger gear pump 5. The two pumps are submerged in oil in a surrounding cylinder 6, whereby the risk of air leaking in is eliminated. The smaller pump 4 is arranged to suck oil through a pipe 7, so that a mixture of gas and oil is led to the larger pump. The proportions of gas and oil in the mixture are dependent on the mutual sizes of the pumps as well as their speeds of rotation. 20 percent by volume of oil has, however, proved sufficent. It has proved suitable to force the oil to the pump 5 in this way instead of simply providing the pump 5 with an inlet communicating with the surrounding oil, because this makes it possible to fix exactly a desired quantity of oil to be sucked.

Gas and oil are emulsified in the pump 5, due to the effective treatment between the teeth, and the solid impurities in the gas are thereby absorbed by the oil. The emulsion is led from the pressure side of the pump 5 through a conduit 8 into a long vertical tube 9, the open lower end of which is submerged in the oil in the cylinder surrounding the pumps. The conduit 8 ends inside the tube 9 by a downwardly directed outlet 10 from which the emulsion emerges as a powerful spray. Owing to the narrow width of the tube this spray damps the arising foam effectively. The purified gas is collected in the upper part of the tube 9, and a discharge conduit 11 from the top of said tube ends in a widened outlet 12 surrounding the inlet to a conduit 14 leading to the absorber described below. The inlet opening 13 of the conduit 14 has a restricted cross section so that a great amount of the gas discharged from the outlet 12 is allowed to escape to the atmosphere around said inlet 13.

The oil vessel 6 which is open both at the top and at the bottom is placed in a surrounding container 15, to which water is continuously supplied from the absorber described below. An overflow outlet 16 is provided to discharge water from the container 15 so that a constant liquid level is kept in it. Thus, the oil in the vessel 6 will rest on a water surface so that the impurities absorbed by it are allowed to sink down into the water and to the bottom of the container 15. Certain impurities, such as $SO_3$ crystals in combustion gases or pulverulent chemicals from soda furnaces, are dissolved in water. The essential feature is that in this way the oil is freed from ashes and continuously keeps the same degree of purity, but, moreover, the water in the container 15 serves to form a cooling jacket around the oil, so that the passing gas will get the same temperature as the one in the absorber.

As mentioned above, the absorber comprises a fluid jet pump 17, which may be of a construction known per se. In the embodiment shown, the jet pump is thought to be coupled to a thrust water service. Of course, a general rule is that the gas to be determined must be soluble in the liquid coming from the pump. In the following, however, it is assumed that the percentage of carbon dioxide in the gas mixture is to be determined and in using the absorber here described water is an entirely effective absorption agent for this gas. The outlet 19 of the pump ends tangentially in the upper part of a cylinder 20, the lower end of which is submerged under the constant water level in the vessel 15. A conduit 21 leads from the upper end of the cylinder to the suction side of a gear pump 22 operating at a constant number of revolutions per unit of time. A branch conduit 18 leads from the suction conduit 21 to the jet pump 17 to return a great amount of the gas to the latter.

The conduit 14 from the purifier ends in the branch conduit 18. As mentioned, the inlet to the conduit 14 has the form of a restricted passage, and therefore only a small part of the gas coming from the conduit 11 is sucked into the absorption system, while the remainder of the gas escapes freely to the atmosphere. Atmospheric pressure is thus prevailing around the inlet 13 and hereby the pressure in the absorption system will be independent of possible fluctuations of the pressure in the conduit 11 from the purifier. Owing to the restricted passage the varying negative pressure in the absorption system will be dependent only on the amount of gas absorbed.

A U-tube manometer 23 is connected to the suction conduit 21 between the branch conduit 18 and the gear pump 22 to indicate the variations in pressure measured in mm. water column. It is also possible to connect a device using the variations in pressure as impulses for the regulation of the supply of fuel or air to the furnace or fire place. Regulators suitable for this purpose are previously described in the patent literature.

Because the gear pump 22 sucks a constant volume per unit of time, the pressure fall after the restricted passage 13 will be dependent on how great a part of the gas mixture is absorbed before entering the pump 22. This pressure fall can be read at the manometer 23. It should be noted that the restricted inlet 13 to the conduit 14 also causes a variation of pressure in the system in dependence on the composition of the gas, and at least regarding carbon dioxide this variation of pressure goes in the same direction as the one caused by the absorption, so that the two effects are added and a greater indication is obtained on the manometer. The carbon dioxide has a greater density than the other components in the gas mixture, and for instance at an increased percentage of carbon dioxide the pressure fall in the restricted passage will therefore be greater. At the same time the pressure in the system is reduced on account of the greater absorption.

The manometer may be graduated directly to indicate the percentage of $CO_2$, when different gases of known compositions are passed through the absorption system.

Before its introduction into the absorber, the gas mixture must at some time have been cooled down to the same temperature as the one prevailing in the absorption system, as otherwise the steam in the gas mixture will condense, when the dew point is passed, and cause a misleading reduction of the negative pressure indicated on the manometer. The hot combustion gases are, of course, cooled when passing the purifier, and in the embodiment described they are cooled down directly to the temperature prevailing in the absorber, in that the water leaving the absorber is led to the container 15 surrounding the purifier. A condition for a favourable result is, of course, that the amount of water is so great that no noticeable heating of it occurs. This applies to the absorber described, which uses an amount of water quite sufficient for cooling the purifier to about the same temperature. In order to obtain a closed system without undesirable variations of the pressure in the absorber, the lower end of the cylinder 20 must in any case be submerged under a constant water level, and also from this point of view it is preferable to have the cylinder 20 placed in the water of the container 15, where a constant water level should be kept also for other reasons.

The gas analysis apparatus according to the invention may be found useful in a number of trades and must not be considered limited to the embodiment described above.

What I claim is:

A gas apparatus for continuously measuring the amount of carbon dioxide in combustion gases, comprising in combination a fluid jet pump in which the jet fluid is a liquid solvent of carbon dioxide, a supply conduit leading from a source of gas to the suction side of the pump and containing a restricted passage, an outlet from the fluid jet pump ending tangentially into an upright cylindrical vessel having a bottom opening immersed below a constant liquid level, a return conduit for gas from the top of the vessel to the suction side of said jet pump to allow gas to repeatedly pass the pump a number of times, a rotary pump arranged to suck a constant volume per unit of time, a conduit for gas from the top of the vessel to the suction side of said rotary pump, and means inserted in the conduit to said rotary pump to indicate the variations of the pressure caused by the absorption of the carbon dioxide by said jet fluid.

References Cited in the file of this patent

UNITED STATES PATENTS

| | | |
|---|---|---|
| 1,320,584 | Stenger | Nov. 4, 1919 |
| 1,897,721 | Cunningham | Feb. 14, 1933 |
| 2,356,845 | Hines | Aug. 29, 1944 |